United States Patent
Matsko et al.

(10) Patent No.: US 8,331,008 B1
(45) Date of Patent: Dec. 11, 2012

(54) PHOTONIC MICROWAVE AND RF RECEIVERS BASED ON ELECTRO-OPTIC WHISPERING-GALLERY-MODE RESONATORS

(75) Inventors: Andrey B. Matsko, Pasadena, CA (US); Anatoliy Savchenkov, Glendale, CA (US); David Seidel, Alta Loma, CA (US); Lute Maleki, Pasadena, CA (US); Vladimir Ilchenko, Arcadia, CA (US)

(73) Assignee: OEwaves, Inc., Pasadena, CA (US)

( * ) Notice: Subject to any disclaimer, the term of this patent is extended or adjusted under 35 U.S.C. 154(b) by 527 days.

(21) Appl. No.: 12/579,406

(22) Filed: Oct. 14, 2009

Related U.S. Application Data

(60) Provisional application No. 61/105,237, filed on Oct. 14, 2008, provisional application No. 61/230,082, filed on Jul. 30, 2009.

(51) Int. Cl.
G02F 1/03 (2006.01)
G02F 1/01 (2006.01)
H01S 3/10 (2006.01)
G02B 6/42 (2006.01)

(52) U.S. Cl. ......... 359/247; 359/239; 359/245; 385/15; 385/39; 385/50; 372/20; 372/26; 372/32

(58) Field of Classification Search .......... 359/239, 359/245, 247, 574; 372/18, 20, 26, 32, 94, 372/108; 385/2, 15, 28, 30, 37, 39, 50; 398/115, 398/162
See application file for complete search history.

(56) References Cited

U.S. PATENT DOCUMENTS

| | | |
|---|---|---|
| 5,204,640 A | 4/1993 | Logan |
| 5,220,292 A | 6/1993 | Bianchini et al. |
| 5,723,856 A | 3/1998 | Yao et al. |
| 5,751,747 A | 5/1998 | Lutes et al. |
| 5,777,778 A | 7/1998 | Yao |
| 5,917,179 A | 6/1999 | Yao |
| 5,929,430 A | 7/1999 | Yao et al. |
| 5,985,166 A | 11/1999 | Unger et al. |
| 6,080,586 A | 6/2000 | Baldeschwieler et al. |
| 6,178,036 B1 | 1/2001 | Yao |
| 6,203,660 B1 | 3/2001 | Unger et al. |
| 6,389,197 B1 | 5/2002 | Iltchenko et al. |
| 6,417,957 B1 | 7/2002 | Yao |
| 6,473,218 B1 | 10/2002 | Maleki et al. |
| 6,476,959 B2 | 11/2002 | Yao |
| 6,487,233 B2 | 11/2002 | Maleki et al. |
| 6,488,861 B2 | 12/2002 | Iltchenko et al. |
| 6,490,039 B2 | 12/2002 | Maleki et al. |

(Continued)

FOREIGN PATENT DOCUMENTS

WO WO0196936 A1 12/2001

(Continued)

OTHER PUBLICATIONS

Braginsky, V.B., et al., "Quality-Factor and Nonlinear Properties of Optical Whispering-Gallery Modes," Physics Letters A, 137(7, 8):393-397, May 1989.

(Continued)

Primary Examiner — Loha Ben
(74) Attorney, Agent, or Firm — Perkins Coie LLP

(57) ABSTRACT

Whispering gallery mode resonator based devices as photonic RF or microwave receivers.

18 Claims, 10 Drawing Sheets

U.S. PATENT DOCUMENTS

| | | |
|---|---|---|
| 6,535,328 B2 | 3/2003 | Yao |
| 6,567,436 B1 | 5/2003 | Yao et al. |
| 6,580,532 B1 | 6/2003 | Yao et al. |
| 6,594,061 B2 | 7/2003 | Huang et al. |
| 6,762,869 B2 | 7/2004 | Maleki et al. |
| 6,795,481 B2 | 9/2004 | Maleki et al. |
| 6,798,947 B2 | 9/2004 | Iltchenko |
| 6,853,479 B1 | 2/2005 | Ilchenko et al. |
| 6,871,025 B2 | 3/2005 | Maleki et al. |
| 6,873,631 B2 | 3/2005 | Yao et al. |
| 6,879,752 B1 | 4/2005 | Ilchenko et al. |
| 6,901,189 B1 | 5/2005 | Savchenkov et al. |
| 6,906,309 B2 | 6/2005 | Sayyah et al. |
| 6,922,497 B1 | 7/2005 | Savchenkov et al. |
| 6,928,091 B1 | 8/2005 | Maleki et al. |
| 6,943,934 B1 | 9/2005 | Ilchenko et al. |
| 6,987,914 B2 | 1/2006 | Savchenkov et al. |
| 7,024,069 B2 | 4/2006 | Savchenkov et al. |
| 7,043,117 B2 | 5/2006 | Matsko et al. |
| 7,050,212 B2 * | 5/2006 | Matsko et al. ............... 359/245 |
| 7,061,335 B2 | 6/2006 | Maleki et al. |
| 7,062,131 B2 * | 6/2006 | Ilchenko ........................ 385/50 |
| 7,092,591 B2 * | 8/2006 | Savchenkov et al. .......... 385/15 |
| 7,133,180 B2 | 11/2006 | Ilchenko et al. |
| 7,173,749 B2 | 2/2007 | Maleki et al. |
| 7,184,451 B2 | 2/2007 | Ilchenko et al. |
| 7,187,870 B2 | 3/2007 | Ilchenko et al. |
| 7,218,662 B1 | 5/2007 | Ilchenko et al. |
| 7,248,763 B1 | 7/2007 | Kossakovski et al. |
| 7,260,279 B2 | 8/2007 | Gunn et al. |
| 7,283,707 B1 | 10/2007 | Maleki et al. |
| 7,356,214 B2 * | 4/2008 | Ilchenko ........................ 385/15 |
| 7,362,927 B1 | 4/2008 | Ilchenko et al. |
| 7,369,722 B2 | 5/2008 | Yilmaz et al. |
| 7,389,053 B1 | 6/2008 | Ilchenko et al. |
| 7,400,796 B1 | 7/2008 | Kossakovski et al. |
| 7,440,651 B1 | 10/2008 | Savchenkov et al. |
| 7,460,746 B2 | 12/2008 | Maleki et al. |
| 7,480,425 B2 | 1/2009 | Gunn et al. |
| 7,587,144 B2 * | 9/2009 | Ilchenko et al. ............... 398/183 |
| 7,630,417 B1 | 12/2009 | Maleki et al. |
| 7,634,201 B2 * | 12/2009 | Maleki et al. ................ 398/202 |
| 7,801,189 B2 * | 9/2010 | Maleki et al. .................. 372/26 |
| 7,965,745 B2 * | 6/2011 | Maleki et al. .................. 372/26 |
| 7,991,025 B2 * | 8/2011 | Maleki et al. .................. 372/20 |
| 2001/0038651 A1 | 11/2001 | Maleki et al. |
| 2002/0018611 A1 | 2/2002 | Maleki et al. |
| 2002/0018617 A1 | 2/2002 | Iltchenko et al. |
| 2002/0021765 A1 | 2/2002 | Maleki et al. |
| 2002/0081055 A1 | 6/2002 | Painter et al. |
| 2002/0085266 A1 | 7/2002 | Yao |
| 2002/0097401 A1 | 7/2002 | Maleki et al. |
| 2003/0160148 A1 | 8/2003 | Yao et al. |
| 2004/0100675 A1 | 5/2004 | Matsko et al. |
| 2004/0109217 A1 | 6/2004 | Maleki et al. |
| 2004/0218880 A1 | 11/2004 | Matsko et al. |
| 2004/0240781 A1 | 12/2004 | Savchenkov et al. |
| 2005/0017816 A1 | 1/2005 | Ilchenko et al. |
| 2005/0063034 A1 | 3/2005 | Maleki et al. |
| 2005/0074200 A1 | 4/2005 | Savchenkov et al. |
| 2005/0123306 A1 | 6/2005 | Ilchenko et al. |
| 2005/0128566 A1 | 6/2005 | Savchenkov et al. |
| 2005/0175358 A1 | 8/2005 | Ilchenko et al. |
| 2005/0248823 A1 | 11/2005 | Maleki et al. |
| 2007/0009205 A1 | 1/2007 | Maleki et al. |
| 2007/0153289 A1 | 7/2007 | Yilmaz et al. |
| 2008/0001062 A1 | 1/2008 | Gunn et al. |
| 2008/0075464 A1 | 3/2008 | Maleki et al. |
| 2008/0310463 A1 | 12/2008 | Maleki et al. |
| 2009/0097516 A1 | 4/2009 | Maleki et al. |
| 2009/0135860 A1 | 5/2009 | Maleki et al. |
| 2009/0208205 A1 | 8/2009 | Eliyahu et al. |
| 2009/0251705 A1 | 10/2009 | Le et al. |
| 2009/0310629 A1 | 12/2009 | Maleki et al. |
| 2009/0324251 A1 | 12/2009 | Ilchenko et al. |
| 2010/0118375 A1 * | 5/2010 | Maleki et al. ................ 359/239 |

FOREIGN PATENT DOCUMENTS

| | | |
|---|---|---|
| WO | WO2005038513 A2 | 4/2005 |
| WO | WO2005055412 A2 | 6/2005 |
| WO | WO2005067690 A2 | 7/2005 |
| WO | WO2006076585 A2 | 7/2006 |
| WO | WO2005122346 A3 | 11/2006 |
| WO | WO2007143627 A3 | 4/2008 |

OTHER PUBLICATIONS

Eliyahu, D., et al., "Low Phase Noise and Spurious Levels in Multi-Loop Opto-Electronic Oscillators," Proceedings of the 2003 IEEE International Frequency Control Symposium and PDA Exhibition, pp. 405-410, May 2003.

Eliyahu, D., et al., "Modulation Response (S21) of the Coupled Opto-Electronic Oscillator," Proceedings of the 2005 IEEE International Frequency Control Symposium and Exposition, pp. 850-856, Aug. 2005.

Eliyahu, D., et al., "Tunable, Ultra-Low Phase Noise YIG Based Opto-Electronic Oscillator," IEEE MTT-S International Microwave Symposium Digest, 3:2185-2187, Jun. 2003.

Gorodetsky, M.L., et al., "Optical Microsphere Resonators: Optimal Coupling to High-Q Whispering-Gallery Modes," J.Opt. Soc. Am. B, 16(1):147-154, Jan. 1999.

Gorodetsky, M.L., et al., "Rayleigh Scattering in High-Q Microspheres," J. Opt. Soc. Am. B, 17(6):1051-1057, Jun. 2000.

Gorodetsky, M.L., et al., "Ultimate Q of Optical Microsphere Resonators," Optics Letters, 21(7):453-455, Apr. 1996.

Hryniewicz, J.V., et al., "Higher Order Filter Response in Coupled Microring Resonators," IEEE Photonics Technology Letters, 12(3):320-322, Mar. 2000.

Huang, S., et al., "A 'Turnkey' Optoelectronic Oscillator with Low Acceleration Sensitivity," 2000 IEEE/EIA International Frequency Control Symposium and Exhibition, pp. 269-279, Jun. 2000.

Ilchenko, V., et al., "Electrooptically Tunable Photonic Microresonators and Photonic Bandgap Waveguide Coupling for Micro-Optoelectronic Oscillators," GOMACTech 2003, Tampa, Florida, pp. 1-4.

Ilchenko, V., et al., "High-Q Microsphere Cavity for Laser Stabilization and Optoelectronic Microwave Oscillator," Proceedings SPIE Microresonators and Whispering-Gallery Modes, vol. 3611, pp. 190-198, Jan. 1999.

Ilchenko, V., et al., "Microsphere Integration in Active and Passive Photonics Devices," Proc. of SPIE Laser Resonators III, vol. 3930, pp. 154-162, Jan. 2000.

Ilchenko, V., et al., "Microtorus: A High-Finesse Microcavity with Whispering-Gallery Modes," Optics Letters, 26 (5):256-258, Mar. 2001.

Ilchenko, V., et al., "Pigtailing the High-Q Microsphere Cavity: A Simple Fiber Coupler for Optical Whispering-Gallery Modes," Optics Letters, 24(11):723-725, Jun. 1999.

Ilchenko, V., et al., "Sub-Micro Watt Photonic Microwave Receiver," IEEE Photonics Technology Letters, 14 (11):1602-1604, Nov. 2002.

Ilchenko, V., et al., "Tunability and Synthetic Lineshapes in High-Q Optical Whispering Gallery Modes," Proc. of SPIE Laser Resonators and Beam Control VI, vol. 4969, pp. 195-206, Jan. 2003.

Ilchenko, V., et al., "Whispering-Gallery-Mode Electro-Optic Modulator and Photonic Microwave Receiver," J. Opt. Soc. Am. B, 20(2):333-342, Feb. 2003.

Ito, H., et al., "InP/InGaAs Uni-Travelling-Carrier Photodiode with 310 GHz Bandwidth," Electronics Letters, 36 (21):1809-1810, Oct. 2000.

Jau, Y.-Y., et al., "Push-Pull Optical Pumping of Pure Superposition States," Physical Review Letters, 93 (16):160802.1-160802.4, Oct. 2004.

Kargapoltsev, S.V., et al., "High-contrast dark resonance in σ+-σ- optical field," Laser Physics Letters, 1 (10):495-499, Oct. 2004.

Knappe, S., et al., "A chip-scale atomic clock based on 87Rb with improved frequency stability," Optics Express, 13 (4):1249-1253, Feb. 2005.

Logan, R., et al., "Stabilization of Oscillator Phase Using a Fiber-Optic Delay-Line," IEEE 45th Annual Symposium on Frequency Control, pp. 508-512, May 1991.

Maleki, L., "The Opto-Electronic Oscillator: Prospects for Extending the State of the Art in Reference Frequency Generation," International Topical Meeting on Microwave Photonics, pp. 195-198, Oct. 1998.

Matsko, A., et al., "Active Mode Locking with Whispering-Gallery Modes," J. Opt. Soc. Am. B, 20(11):2292-2296, Nov. 2003.

Matsko, A., et al., "Magnetometer based on the opto-electronic microwave oscillator," Optics Communications, 247 (1-3):141-148, Mar. 2005.

Matsko, A., et al., "Whispering-Gallery-Mode based Optoelectronic Microwave Oscillator," Journal of Modern Optics, 50(15-17):2523-2542, Feb. 2004.

Matsko, A., et al., "Whispering-Gallery-Mode Resonators as Frequency References. I. Fundamental Limitations," J. Opt. Soc. Am. B, 24(6):1324-1335, Jun. 2007.

Myers, L.E., et al., "Quasi-Phase-Matched Optical Parametric Oscillators in Bulk Periodically Poled LiNbO3," J. Opt. Soc. Am. B, 12(11):2102-2116, Nov. 1995.

Rosenbluh, M., et al., "Differentially detected coherent population trapping resonances excited by orthogonally polarized laser fields," Optics Express, 14(15):6588-6594, Jul. 2006.

Savchenkov, A., et al., "RF photonic signal processing components: From high order tunable filters to high stability tunable oscillators," IEEE Radar Conference, pp. 1-6, May 2009.

Savchenkov, A., et al., "Tunable optical single-sideband modulator with complete sideband suppression," Optics Letters, 34(9):1300-1302, May 2009.

Savchenkov, A., et al., "Tunable Resonant Single-Sideband Electro-Optical Modulator," Digest of the IEEE/LEOS Summer Topical Meetings, pp. 63-64, Jul. 2009.

Savchenkov, A., et al., "Whispering-Gallery-Mode Resonators as Frequency References. II. Stabilization," J. Opt. Soc. Am. B, 24(12): 2988-2997, Dec. 2007.

Schwindt, P., et al., "Chip-scale atomic magnetometer," Applied Physics Letters, 85(26):6409-6411, Dec. 2004.

Strekalov, D., et al., "Application of vertical cavity surface emitting lasers in self-oscillating atomic clocks," Journal of Modern Optics, 53(16-17):2469-2484, Nov. 2006.

Vanier, J., "Atomic clocks based on coherent population trapping: a review," Applied Physics B, 81(4):421-442, Aug. 2005.

Vassiliev, V.V., et al., "Narrow-Line-Width Diode Laser with a High-Q Microsphere Resonator," Optics Communications, 158(1-6):305-312, Dec. 1998.

Yao, X.S., et al., "A Novel Photonic Oscillator," Digest of the LEOS Summer Topical Meetings, pp. 17-18, Aug. 1995.

Yao, X.S., et al., "A Novel Photonic Oscillator," TDA Progress Report 42-122, pp. 32-43, Aug. 1995.

Yao, X.S., et al., "Converting Light into Spectrally Pure Microwave Oscillation," Optics Letters, 21(7):483-485, Apr. 1996.

Yao, X.S., et al., "Coupled Optoelectronic Oscillators for Generating Both RF Signal and Optical Pulses," Journal of Lightwave Technology, 18(1):73-78, Jan. 2000.

Yao, X.S., et al., "Dual Microwave and Optical Oscillator," Optics Letters, 22(24):1867-1869, Dec. 1997.

Yao, X.S., et al., "Multiloop Optoelectronic Oscillator," IEEE Journal of Quantum Electronics, 36(1):79-84, Jan. 2000.

Yao, X.S., et al., "Optoelectronic Microwave Oscillator," J. Opt. Soc. Am. B, 13(8):1725-1735, Aug. 1996.

Yao, X.S., et al., "Optoelectronic Oscillator for Photonic Systems," IEEE Journal of Quantum Electronics, 32 (7):1141-1149, Jul. 1996.

Yu, J., et al., "Compact Optoelectronic Oscillator with Ultra-Low Phase Noise Performance," Electronics Letters, 35 (18):1554-1555, Sep. 1999.

Zanon, T., et al., "High Contrast Ramsey Fringes with Coherent-Population-Trapping Pulses in a Double Lambda Atomic System," Physical Review Letters, 94(19):193002.1-193002.4, May 2005.

* cited by examiner

PHOTONIC MICROWAVE AND RF RECEIVERS BASED ON ELECTRO-OPTIC WHISPERING-GALLERY-MODE RESONATORS

This patent document claims the benefits of U.S. Provisional Application No. 61/105,237 entitled "Suppression of DC Background in a Coherent Photonic Microwave Receiver" and filed Oct. 14, 2008, and U.S. Provisional Application No. 61/230,082 entitled "Tunable RF Photonic Receiver and RF Spectrum Analyzer Resolution Booster" and filed Jul. 30, 2009. The disclosures of the above applications are incorporated by reference as part of the disclosure of this document.

BACKGROUND

This document relates to optical resonators and devices using optical resonators.

Optical resonators can be configured in various configurations. Examples of well-known optical resonator designs includes Fabry-Perot optical resonators and optical ring resonators. As another example, an optical material such as a dielectric material may be shaped to construct an optical whispering-gallery-mode ("WGM") resonator which supports one or more resonator modes known as whispering gallery ("WG") modes. These WG modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the equator of the sphere. The resonator dimension is generally much larger than the wavelength of light so that the optical loss due to the finite curvature of the resonators is small. As a result, a high quality factor, Q, e.g., greater than $10^9$, may be achieved in such resonators. Hence, optical energy, once coupled into a whispering gallery mode, can circulate within the WGM resonator with a long photon life time. Such hi-Q WGM resonators may be used in many optical applications, including optical filtering, optical delay, optical sensing, lasers, and opto-electronic oscillators.

SUMMARY

In one aspect, a whispering gallery mode resonator based device is provided to include an optical resonator made of an electro-optic material exhibiting an electro-optic effect and shaped to support one or more optical whispering gallery modes; electrodes formed on the optical resonator to receive an RF or microwave signal and to apply the received RF or microwave signal to the optical resonator; a laser that produces a continuous wave laser beam at an optical carrier frequency; and an evanescent optical coupler located to couple the laser beam from the laser into the optical resonator and to couple light inside the optical resonator out to produce an output beam. Light inside the optical resonator is modulated via the electro-optic effect in response to the received RF or microwave signal to produce one or more modulation sidebands at frequencies different from the optical carrier frequency. This device includes a photodetector located to receive the output beam from the optical resonator to detect a baseband signal in the received RF or microwave signal; and an optical element located in an optical path between the evanescent optical coupler and the photodetector to transmit light to the photodetector while blocking light at the optical carrier frequency to prevent light at the optical carrier frequency from reaching the photodiode.

In another aspect, a whispering gallery mode resonator based device is provided to include an optical resonator made of an electro-optic crystal and structured to support optical whispering gallery modes in two orthogonally polarized transverse electric (TE) modes and transverse magnetic (TM) modes circulating along a circular optical loop near a rim of the optical resonator; a laser that produces a continuous wave laser beam at an optical carrier frequency; an evanescent optical coupler located to couple the laser beam from the laser into the optical resonator and to couple light inside the optical resonator out to produce an output beam; electrodes formed on the optical resonator to receive an RF or microwave signal to the optical resonator in an electric field polarization oriented relative to a crystal axis of the electro-optic crystal to effectuate coupling between an optical whispering gallery mode in the TE mode and another optical whispering gallery mode in the TM mode to produce an optical single sideband on light in the optical resonator at a frequency different from the optical carrier frequency; an antenna that receives the RF or microwave signal from the air and is coupled to the electrodes to direct the received RF or microwave signal to the electrodes; a frequency control mechanism coupled to the optical resonator to tune a frequency spacing between the optical single sideband and the optical carrier frequency; and an optical detector unit that receives the output beam from the optical resonator.

Various implementations are described in greater detail in the attached drawings, the detailed description and the claims.

DETAILED DESCRIPTION

Many WGM resonators are axially or cylindrically symmetric around a symmetry axis around which the WG modes circulate in a circular path or the equator. The exterior surface of such a resonator is smooth and provides spatial confinement to light around the circular plane to support one or more WG modes. The exterior surface may be curved toward the symmetry axis to spatially confine the light along the symmetry axis. A WGM resonator may be shaped symmetrically around a symmetry axis and has a protruded belt region to form a circular path to confine light in one or more WG modes. The exterior surface of the protruded belt region may be any suitable geometrical shape such as a flat surface or a curved surface. Such a WGM resonator may be configured in any suitable physical size for a given wavelength of light. Various materials can be used for WGM resonators and include, for example, crystal materials and non-crystal materials. Some examples of suitable dielectric materials include fused silica materials, glass materials, lithium niobate materials, lithium tantalate materials and calcium fluoride materials.

Optical coupling of light into or out of a WGM resonator can be achieved by using an evanescent optical coupler that is placed either in contact with or spaced from the exterior surface of the WGM resonator by a gap so that the evanescent optical coupler is within the space where the evanescent field of the light confined in one or more WG modes of the WGM resonator are present. The evanescent optical coupler interacts with the evanescent field to effectuate the evanescent coupling. Efficient coupling can be achieved by satisfying the mode matching condition at the interface of the evanescent optical coupler and the WGM resonator. Optical prisms, fiber tapers, tapered fiber, photonic bandgap structures and other optical structures can be used to implement the evanescent optical coupler under respective proper mode matching conditions.

A whispering gallery mode resonator can be made of a material exhibiting an electro-optic effect and can include electrodes on the optical resonator to apply an RF (radio frequency) or microwave signal to the optical resonator to effectuate the electro-optic effect to control the one or more optical whispering gallery modes circulating along a circular optical path or loop near a rim of the optical resonator. The electro-optic effect in such a WGM resonator can be used to tune the resonator and to modulate light for a wide range of applications.

Figure 1A:
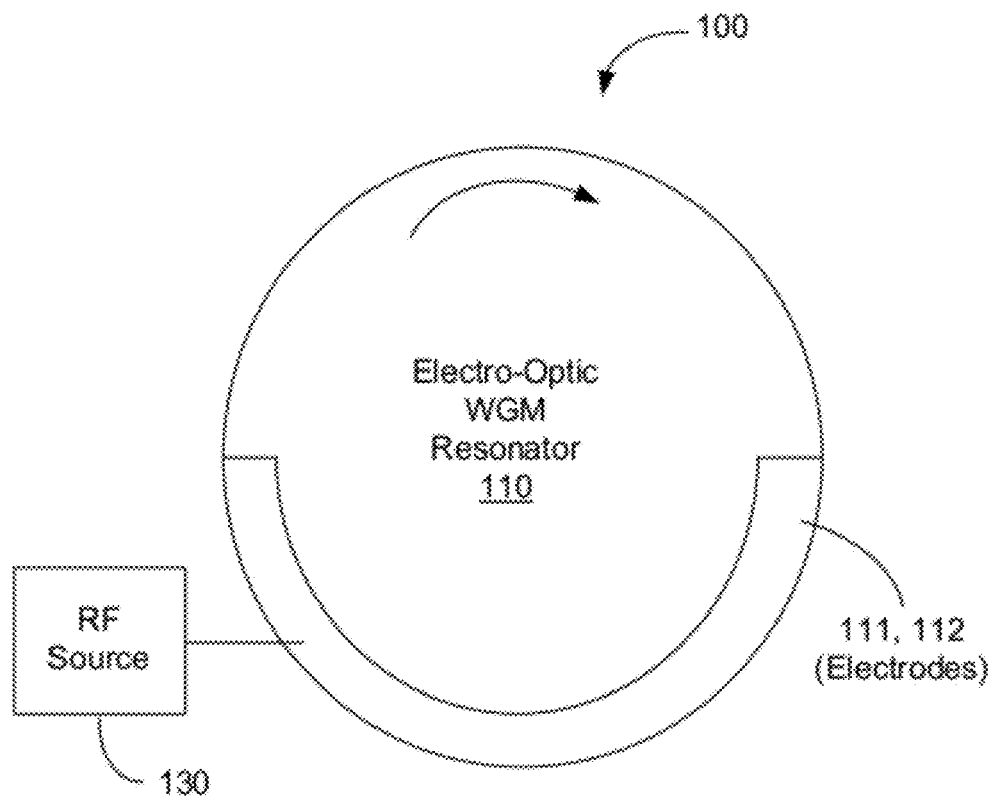
FIGS. 1A and 1B show an example of an electro-optic WGM resonator.
Figure 1B:
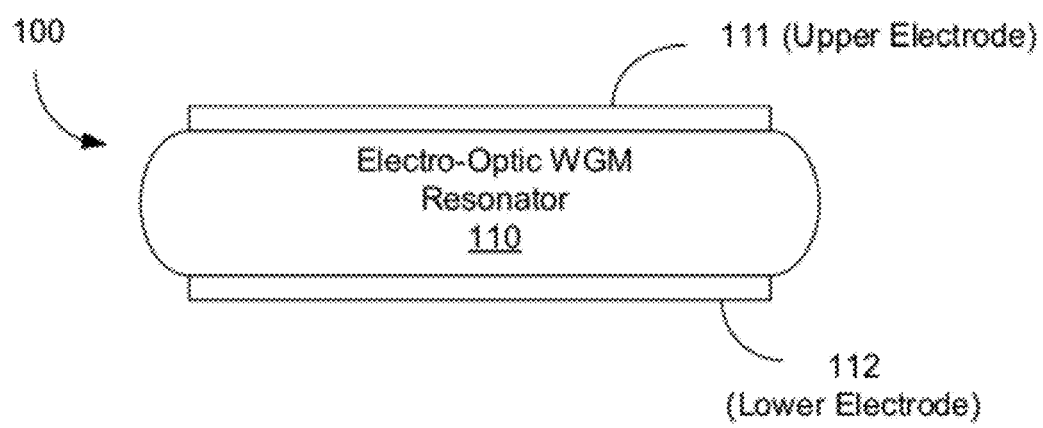

FIGS. 1A and 1B show an example of an electro-optic WGM resonator 100 having a WGM resonator 110. The electro-optic material for the entire or part of the resonator 110 may be any suitable material, including an electro-optic crystal such as lithium niobate ("Lithium Niobate resonator"), lithium tantalate and semiconductor multiple quantum well structures. One or more electrodes 111 and 112 may be formed on the resonator 110 to apply a control electrical field in at least the region where the WG modes are present to control the index of the electro-optical material and to change the filter function of the resonator. Assuming the resonator 110 has disk or ring geometry, the electrode 111 may be formed on the top of the resonator 110 and the electrode 112 may be formed on the bottom of the resonator 110 as illustrated in the side view of the device in FIG. 1B. In one implementation, the electrodes 111 and 112 may constitute an RF or microwave resonator to apply the RF or microwave signal to co-propagate along with the desired optical WG mode. For example, the electrodes 111 and 112 may be microstrip line electrodes. The electrodes 111 and 112 may also form an electrical waveguide to direct the electrical control signal to propagate along the paths of the WG modes. An RF or microwave circuit 130 such as a control circuit may be used to supply the electrical control signal to the electrodes 111 and 112.

In operating the tunable resonator 100, the control unit 130 may supply a voltage as the electrical control signal to the electrodes 111 and 112. The control voltage may be a DC voltage to set the resonance peak of the resonator 100 at a desired spectral location. The DC voltage may be adjusted by the control unit 130 to tune the spectral position of the transmission peak when such tuning is needed. For dynamic tuning operations, the control unit 130 adjusts the control voltage in response to a control signal to, e.g., maintain the transmission peak at a desired spectral position or frequency or to change the frequency of the transmission peak to a target position. In some other operations, the control unit 130 may adjust the control voltage in a time varying manner, e.g., scanning the transmission peak at a fixed or varying speed or constantly changing the transmission peak in a predetermined manner or to produce signal modulation. In some applications, both a modulation electrical signal and a DC electrical signal can be applied to the electrodes on the resonator 100.

For example, a Z-cut $LiNbO_3$ disk cavity with a diameter of d=4.8 mm and a thickness of 170 μm may be used as the resonator 110. The cavity perimeter edge may be prepared in the toroidal shape with a 100 μm radius of curvature. As an alternative to the strip electrodes shown in FIG. 1A, the top and bottom surfaces of the disk resonator may be coated with conductive layers for receiving the external electrical control signal. A metal such as indium may be used to form the conductive coatings. Tuning is achieved by applying and adjusting a voltage to the top and bottom conductive electrodes or coatings. Each conductive electrode or coating may be absent in the central part of the resonator and placed at or near the perimeter edge of the resonator where WGMs are localized.

One technical feature of such an electro-optic WGM resonator is the phase matching between the applied RF and microwave signal and the light in a WGM inside the resonator to provide efficient interaction between the light and the applied RF and microwave signal. As an example, in a WGM optical resonator made of a material exhibiting an electro-optic effect and shaped to support one or more optical whispering gallery modes circulating along a circular optical loop near a rim of the optical resonator, the geometry of the electrodes on the WGM resonator can be designed to facilitate this phase matching.

Application of an RF signal to an electro-optic WGM resonator can lead to optical modulation. Depending on the material properties of the electro-optic material used for the WGM resonator and the operating conditions of the WGM resonator, different optical modulations can occur. Two different optical modulation schemes are described below as examples.

In some implementations of electro-optic modulation in electro-optic WGM resonators, a high modulation efficiency and RF frequency filtering can be obtained via resonance coupling to electrodes and/or the use of optical resonances of the WGM resonator. Crystalline whispering gallery mode (WGM) resonators fabricated with electro-optic materials are useful as such narrowband modulators. The RF signal is sent to the electrodes formed on the WGM resonator forming an RF resonator. The pump light coupled into the WGM resonator interacts with the RF signal to generate optical harmonics at frequencies corresponding to the sum and difference of the optical carrier and the RF carrier frequencies. The optical harmonics interact with the RF to produce new harmonics. This process is sustained when the phase matching condition is satisfied and if the optical resonator modes coincide with the generated optical harmonics to host the generated optical harmonics. The reception bandwidth of the receiver based on such optical modulation is restricted by the spectral widths of the optical and RF resonances. The information carried by the RF signal is retrieved by processing and detecting the optical harmonics in the light coupled out of the WGM resonator. A photodetector (PD) having a bandwidth corresponding to the RF frequency can be used to detect the light coupled out of the WGM resonator.

For example, the center frequency of the RF carrier is set to be equal to the optical free spectral range (FSR) of the resonator and the optical polarization of the pump light for optically exciting the WGM resonator is identical to the optical polarization of the light in one or more WG modes excited in the WGM resonator. The optical modulation in response to the RF signal under such a resonance condition produces multiple sidebands on both sides of the optical carrier. The spacing between two adjacent sidebands or between the optical carrier and an adjacent sideband is the FSR of the WGM resonator.

Figure 2:
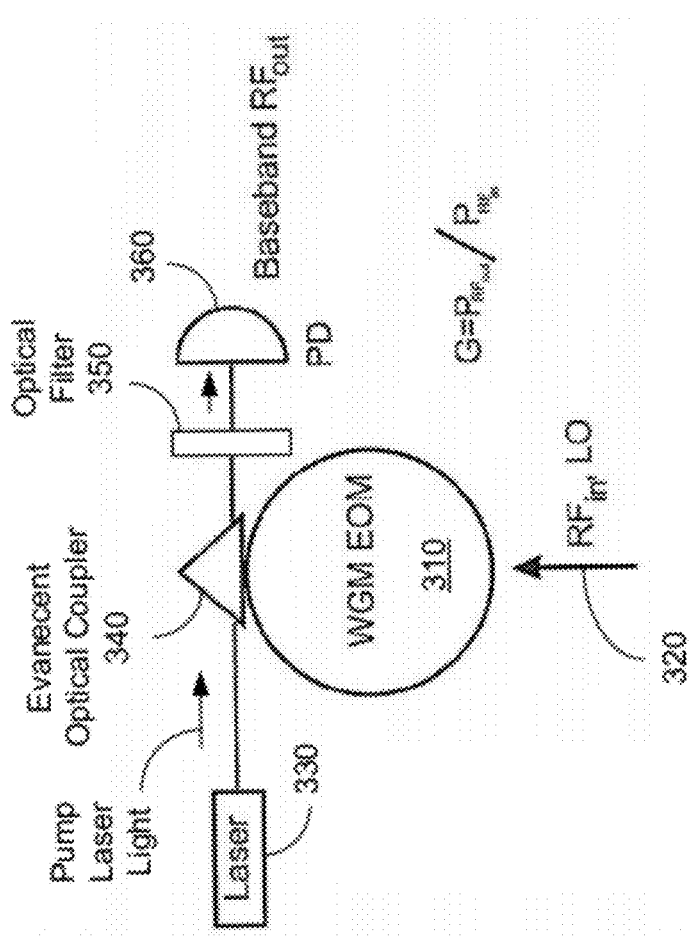
FIG. 2 shows spectral properties of optical modulation under a resonance condition in an electro-optic WGM resonator modulator.

FIG. 2 shows spectral properties of optical modulation under a resonance condition in an electro-optic WGM resonator modulator. The upper diagram shows the optical carrier and modulation sidebands generated by the optical modulation. The lower diagram shows the optical modes of the WGM resonator.

Figure 3:
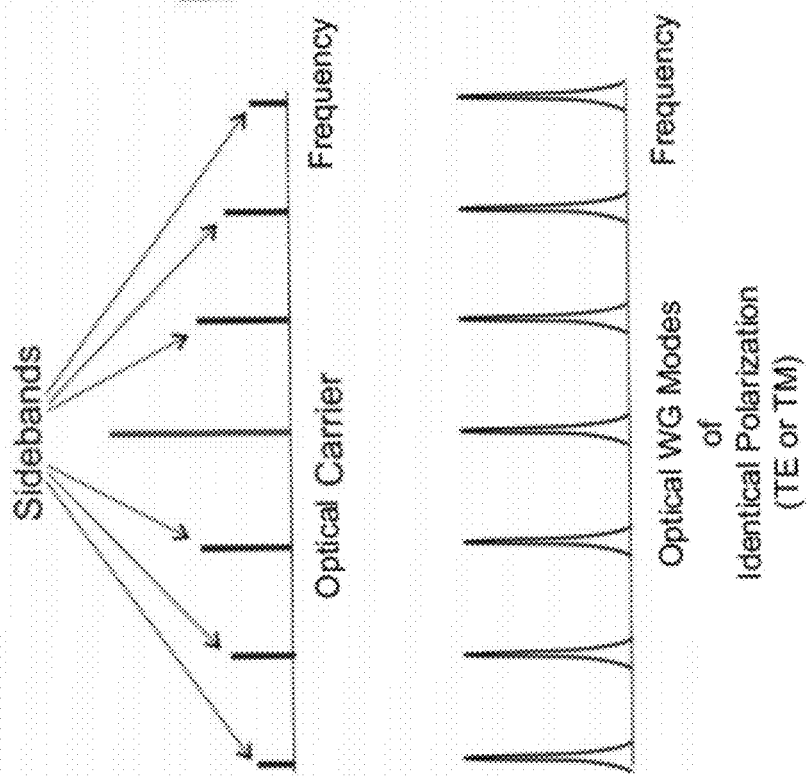
FIG. 3 shows an example of a microwave or RF receiver based on an electro-optic modulator (EOM) formed from a WGM resonator (WGM EOM).

FIG. 3 shows an example of a microwave or RF receiver based on an electro-optic modulator (EOM) formed from a WGM resonator (WGM EOM). In this example, an electro-optic WGM resonator modulator 310 based on the design in FIGS. 1A and 1B is provided. The electrodes on the WGM resonator modulator 310 is used to receive an input RF signal 320 which can be a received RF signal from an RF antenna which is in communication with the electrodes formed on the WGM resonator modulator 310. An RF local oscillator (LO) signal may also be applied to the electrodes along with the input RF signal 320.

Continuous-wave (CW) laser light from a laser 330 is used to optically pump the WGM resonator modulator 310. An evanescent optical coupler 340 is used to couple the laser light from the laser 330 into the WGM resonator modulator 310 and to couple light inside the WGM resonator modulator 310 out of the WGM resonator modulator 310 as an optical output of the WGM resonator modulator 310. For example, the evanescent optical coupler 340 can be an optical prism serving an the input and output optical coupler for the WGM resonator modulator 310. A photodetector (PD) 360, provided in the optical path of the optical output, is used to detect the optical output and to produce an RF baseband output.

The light received by the photodetector 360 includes different components, including the light at the optical carrier frequency which does not carry useful information and is optical noise. The presence of the light at the optical carrier frequency degrades the detection sensitivity and the dynamic range of the optical detection at the photodetector 360. Since the laser light received by the WGM resonator modulator 310 has the same optical polarization as the light in one or more WG modes inside the WGM resonator modulator 310, the optical output from the WGM resonator modulator 310 has the same optical polarization of the pump light at the optical carrier frequency, a feasible technique for reducing the presence of the pump light at the photodetector 360 is insert an optical filter 350 in the optical path of the optical output to filter out light at the optical carrier frequency while transmitting light at one or more sideband frequencies that are different from the optical carrier frequency.

This filter 350 can be implemented in various configurations, e.g., a solid state Fabry-Perot etalon. The Fabry-Perot etalon can be configured to process a high finess (e.g., greater than 5) to suppress the light at the optical carrier frequency. In some implementations, the filter 350 can be configured to reject light at the optical carrier frequency while transmitting at sideband frequencies on two opposite sides of the optical carrier frequency. In other implementations, the filter 350 can be configured to reject light at the optical carrier frequency while transmitting at one or more sideband frequencies on only one side of the optical carrier frequency, e.g., a single sideband at a selected side of the optical carrier frequency.

Certain electro-optic materials exhibit non-zero off-diagonal elements of their electro-optic tensor and can be used to effectuate coupling of two orthogonally polarized WG modes of an electro-optic WGM resonator modulator via interaction with the applied RF signal. This RF-coupled interaction between two family modes of orthogonal polarizations, e.g. the transverse magnetic (TM) mode and the transverse electric (TE) mode can be used to construct an electro-optic WGM resonator modulator for single sideband (SSB) modulation.

Figure 4:
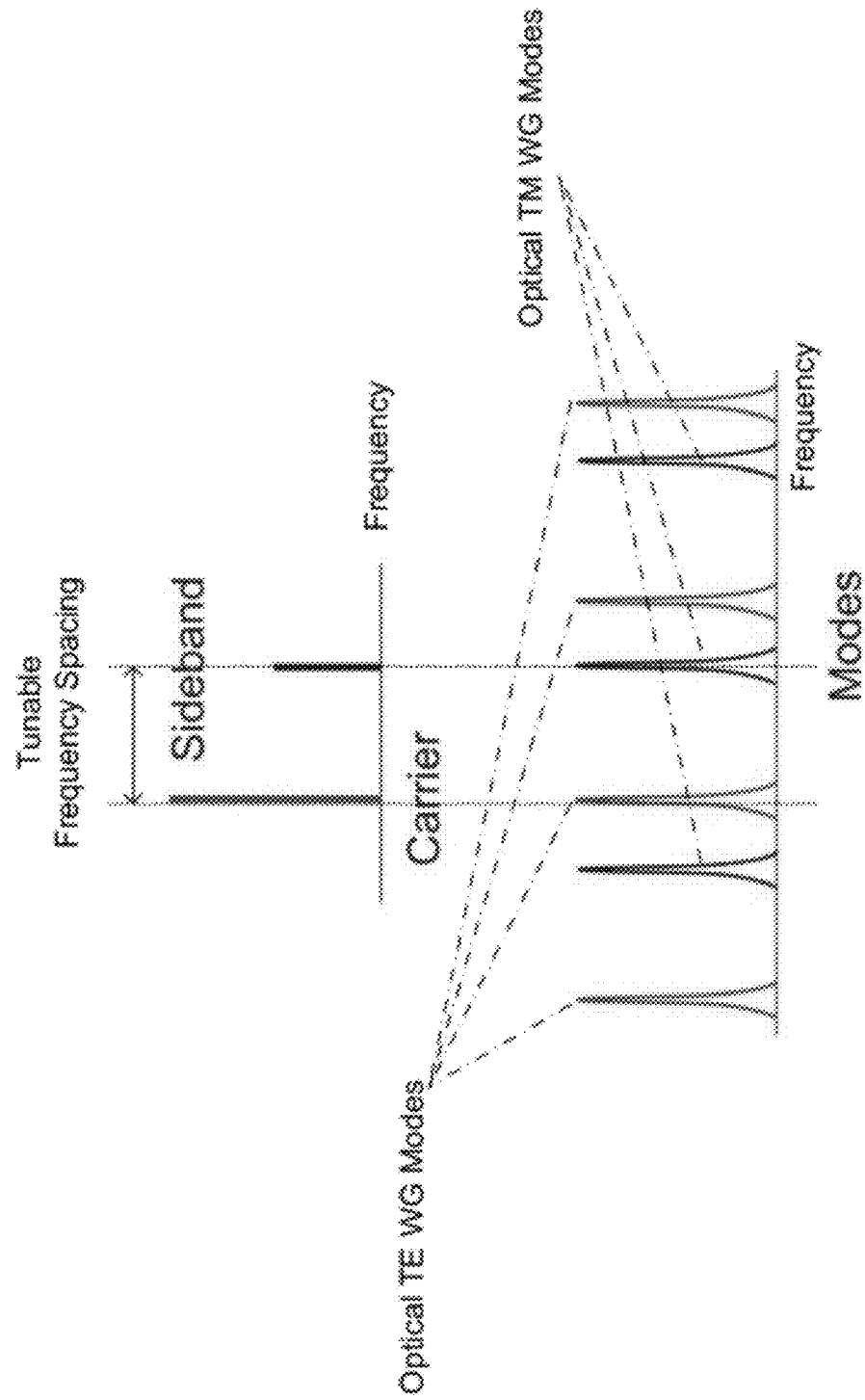
FIG. 4 illustrates the spectral properties of Single Sideband (SSB) modulation in an electro-optic WGM resonator modulator.

FIG. 4 illustrates the spectral properties of SSB modulation in an electro-optic WGM resonator modulator. The upper diagram shows the entire spectrum of the optical output of the electro-optic WGM resonator modulator without any optical filtering, where only a single modulation sideband is generated on one side of the optical carrier. The lower diagram shows two families of WG modes with orthogonal polarizations (TE and TM modes) that support light at the optical carrier frequency and the generated single sideband. This TE-TM waveguide mode coupling via off-diagonal elements of the electro-optic tensor of the modulator host material is a departure from the resonant electro-optic WGM resonator modulators shown in FIGS. 2 and 3 based on coupling between modes of the same family (TE-TE or TM-TM) using diagonal elements of an electro-optic tensor of the host electro-optic material. Referring to FIGS. 1A and 1B, the shape of the RF electrodes applied to an electro-optic crystal (e.g., Z-cut lithium tantalite crystal) in a WGM resonator can be structured to effectuate an efficient coupling of TE whose electric field is perpendicular to the Z axis and TM whose electric field is parallel to the Z axis, where the Z axis is the symmetry axis of the resonator coinciding with the c axis of the crystal.

Notably, the TE and TM WGM modes respectively at the optical carrier frequency and the frequency of the single sideband in FIG. 4 is separated not by the optical free spectral range of the WGM resonator, but rather by some frequency determined by the electro-optic effect in the resonator, e.g., determined by one or combination of various influences that affect the electro-optic effect in the resonator, e.g., resonator shape, temperature, and the bias voltage. Based on this, the TE and TM mode families can be tuned with respect to one another using the electro-optic effect by changing the electro-optic coefficients for agile tunability of the modulation frequency which is the difference between the optical carrier and the frequency of the generated single sideband (upper diagram of FIG. 4). The tenability comes from the different response of the TE and the TM modes to an external energy or influence applied to the crystal for changing the electro-optic coefficients. One exemplary technique for tuning this frequency is to change a DC bias voltage on the crystal. One another exemplary technique for tuning this frequency is to change the temperature of the crystal. Yet another exemplary technique for tuning this frequency is to apply a force to compress the crystal.

In this regard, a method for operating a whispering gallery mode resonator device to achieve SSB operation can include coupling light into an optical resonator made of a crystal (e.g., a ferroelectric crystal) and structured to support optical whispering gallery modes in two orthogonally polarized TE and TM modes circulating along a circular optical loop near a rim of the optical resonator; and applying an RF or microwave signal to the optical resonator in an electric field polarization oriented relative to a crystal axis of the crystal to effectuate coupling between light in an optical whispering gallery mode in the TE mode and light in another optical whispering gallery mode in the TM mode to produce a tunable optical single sideband modulation at a modulation frequency equal to a difference in optical frequencies of the optical whispering gallery modes in the TE and TM modes.

Figure 5:
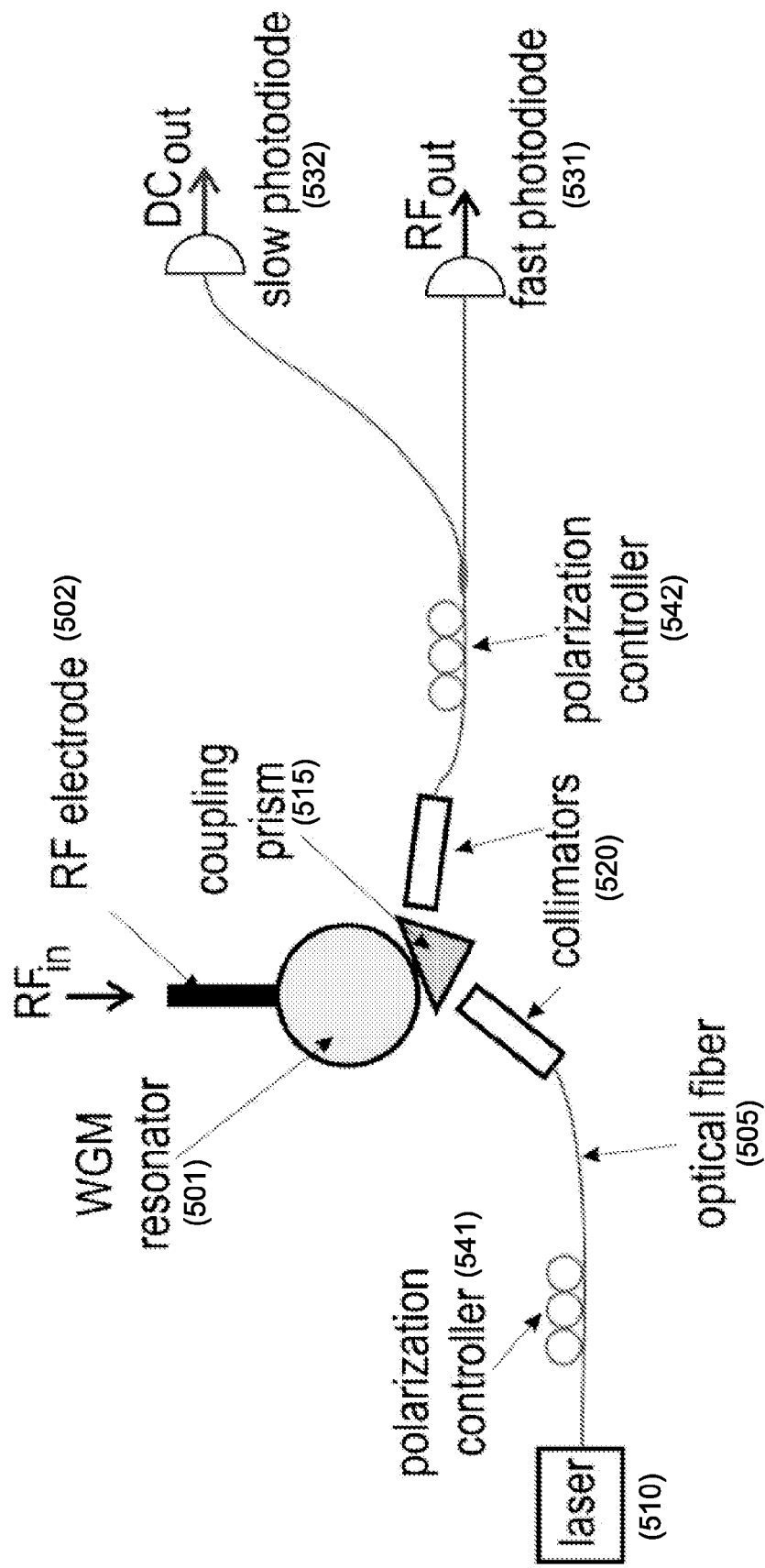
FIG. 5 shows an example of a SSB modulator based on an electro-optic WGM resonator.
Figure 6:
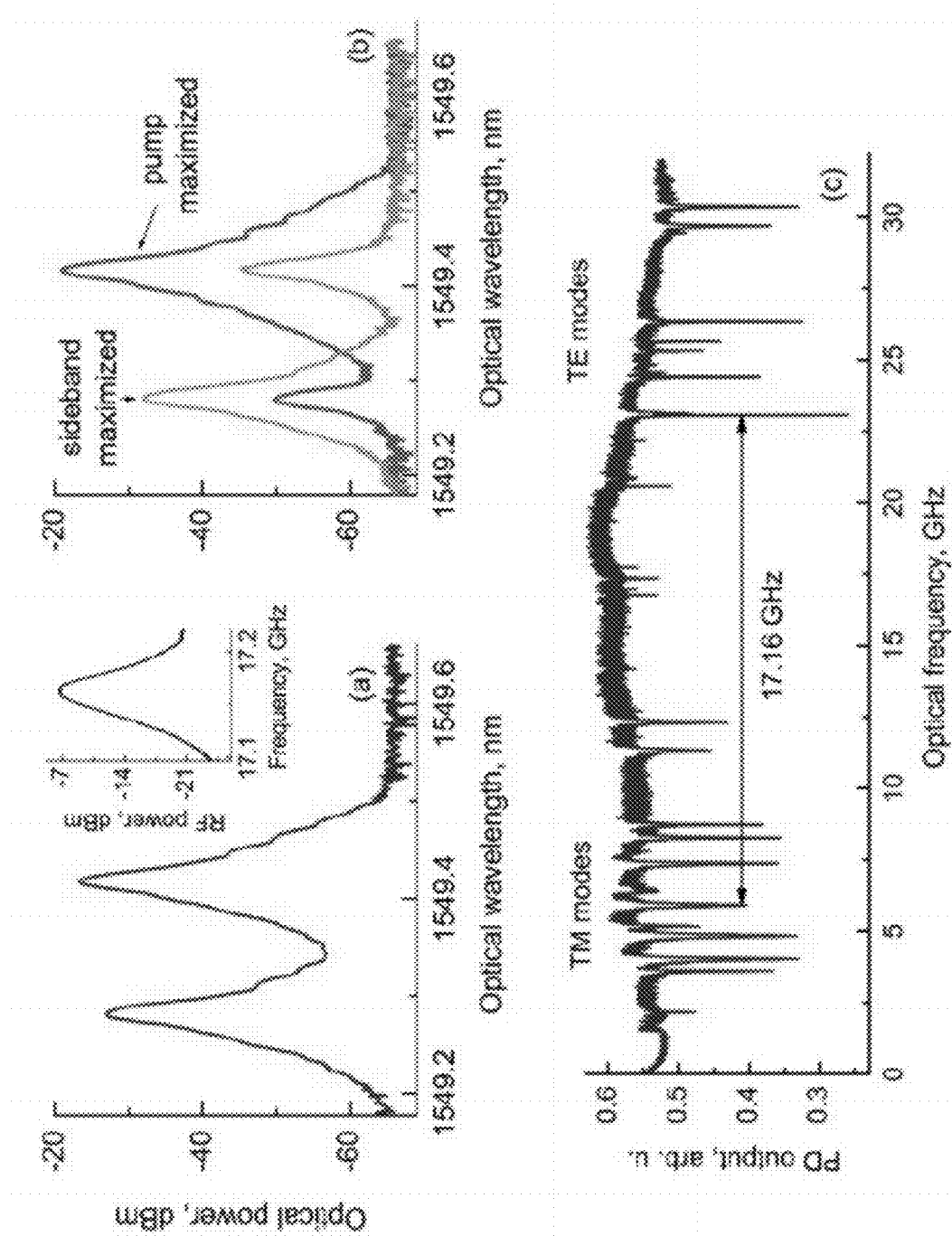
FIG. 6 shows measurements of the performance of the exemplary SSB modulator in FIG. 5.

For example, WGM resonators made of $LiNbO_3$ and $LiTaO_3$ can be used to create coupling between light and RF fields, achieved by engineering the shape of a micro-strip RF resonator coupled to a WGM resonator. FIG. 5 shows an example of such a SSB modulator based on an electro-optic WGM resonator and FIG. 6 shows measurements obtained from this SSB modulator.

In FIG. 5, a toroidal WGM resonator 501 is placed to a conductive substrate and an rf electric field is applied to its rim. The resonator is fabricated of Z-cut lithium tantalate and the symmetry axis of the resonator coincides with the c axis of the crystal. A stripline RF electrode 502 is situated in the direct vicinity of the localization of the basic WGM sequence. The electrode is designed in such a way that the rf electric field is polarized orthogonally to the surface of the resonator and is maximized at the extremity perimeter of the resonator. A dc electric field is applied along the Z axis of the resonator to tune the WGM spectrum.

Light from a laser 510 is coupled into and out of the WGM resonator 501 via a coupling prism 515. The laser 510 is linked to the WGM resonator 501 by an optical fiber 505. In this example, a polarization controller 541 is coupled to the optical fiber 505. Optical collimators 520 are used for coupling light into and out of the prism 515 in such a way that the fundamental (the closest to the resonator surface) TM and TE mode sequences are excited with the light. In our tests, a WGM resonator of a diameter of 935 μm and 100 μm in thickness was used and has an optical free spectral range of 48 GHz. The rim of the resonator was shaped as a toroid such that the cross section of the modes belonging to the basic WGM family become an ellipse with 1.6 μm and 7.5 μm with nearly orthogonal polarizations. All the modes have approximately the same intrinsic (unloaded) quality factor resulting from the material absorption, reaching $6 \times 10^8$ at 1550 nm for the particular sample. The resonator was overloaded with the prism so that the FWHM of the TE and TM modes became 1 and 20 MHz, respectively.

Two photodetectors are used in FIG. 5 to measure different signal components in the output light of the SSB modulator. The two photodetectors are linked to the WGM resonator 501 by the optical fiber 505. In this example, a polarization controller 542 is coupled to the optical fiber 505. A fast photodiode 531 is used to measure the RF output and a slow photodiode 532 is used to measure the DC output.

FIG. 6 shows measurements of the performance of the above exemplary SSB modulator. FIG. 6(a) shows the measured spectrum of the light exiting the modulator showing presence of only one sideband. The inset in FIG. 6(a) show the spectrum of the RF return of the optical signal demodulated on a fast photodiode showing the resonant modulation frequency of 17.16 GHz and the spectral width of 20 MHz. The angle of the polarizer installed after the WGM resonator is selected such that the rf return power is maximized. FIG. 6(b) shows the measured optical spectrum shown in FIG. 6(a) with the polarizer installed after the resonator tuned ±45° with respect to the position selected to obtain FIG. 6(a). Hence, the optical carrier and the sideband are polarized orthogonally. FIG. 6(c) shows the measured optical spectrum of the WGM resonator showing the modes involved with the modulation process.

In the conducted measures, application of the rf field to the RF electrode caused the modulation at the separation frequency of TE and TM modes shown in FIG. 6(a). The modulation was measured by using both an optical spectrum analyzer and an rf spectrum analyzer. The modulation has only one first-order sideband, no second-order sideband, and no symmetrical sideband. The experimentally measured sideband suppression exceeds 40 dB and is given by the noise floor of our spectrum analyzer. A coherent detection technique was used to improve the measurement sensitivity by 20 dB and the second sideband was not detected in the measured spectrum. The optical polarizer placed after the modulator was rotated to suppress either the carrier or the sideband, proving that they are orthogonally polarized as shown in FIG. 6(b).

The above measurements indicate that the coupling between TM and TE modes is efficient. The optical sideband power became equal to the carrier power only for 2 mW of rf power applied to the resonator. The light escaping the modulator was captured by the slow photodiode and the changes caused by loading the resonator was tracked with and without the applied rf field. The spectrum of the optically pumped mode appears as a dip if no rf field is present; the dip decreases if the rf field is applied. Pumping light into the spectrally broader mode caused the appearance of a narrow transparency peak inside the absorption curve.

The SSB modulator is tunable by tuning either or both of the temperature of the resonator and the dc voltage applied to the top and the bottom surfaces of the resonator. Tests were conducted to show a frequency shift of the WGM spectrum caused by the temperature change and the DC voltage change. The TE and the TM modes shift with different rates so that the relative frequency of the mode families changes resulting in modification of the modulation frequency. Measurements showed 1 GHz/K thermal and 80 MHz/V electro-optical shifts of the modulation frequency. In tuning the modulation frequency, the frequency of the laser carrier is tuned to follow one of the WGMs. One of the advantages of the electro-optical frequency tuning is its agility, and the tuning speed reaches 1 GHz/μs for the setup reported here. The tunability range can approach tens of gigahertz and is fundamentally limited either by the damage of the material with the applied dc electric field (2 kV/mm for stoichiometric LiTaO3) or by the mechanical damage from the differential thermal expansion of the setup.

In the above SSB WGM modulator, the pump light and the light in the single sideband are orthogonally polarized with respect to each other. This feature allows for implementation of a polarization selective detection to reduce the noise in the optical to RF conversion part of the device.

Figure 7:
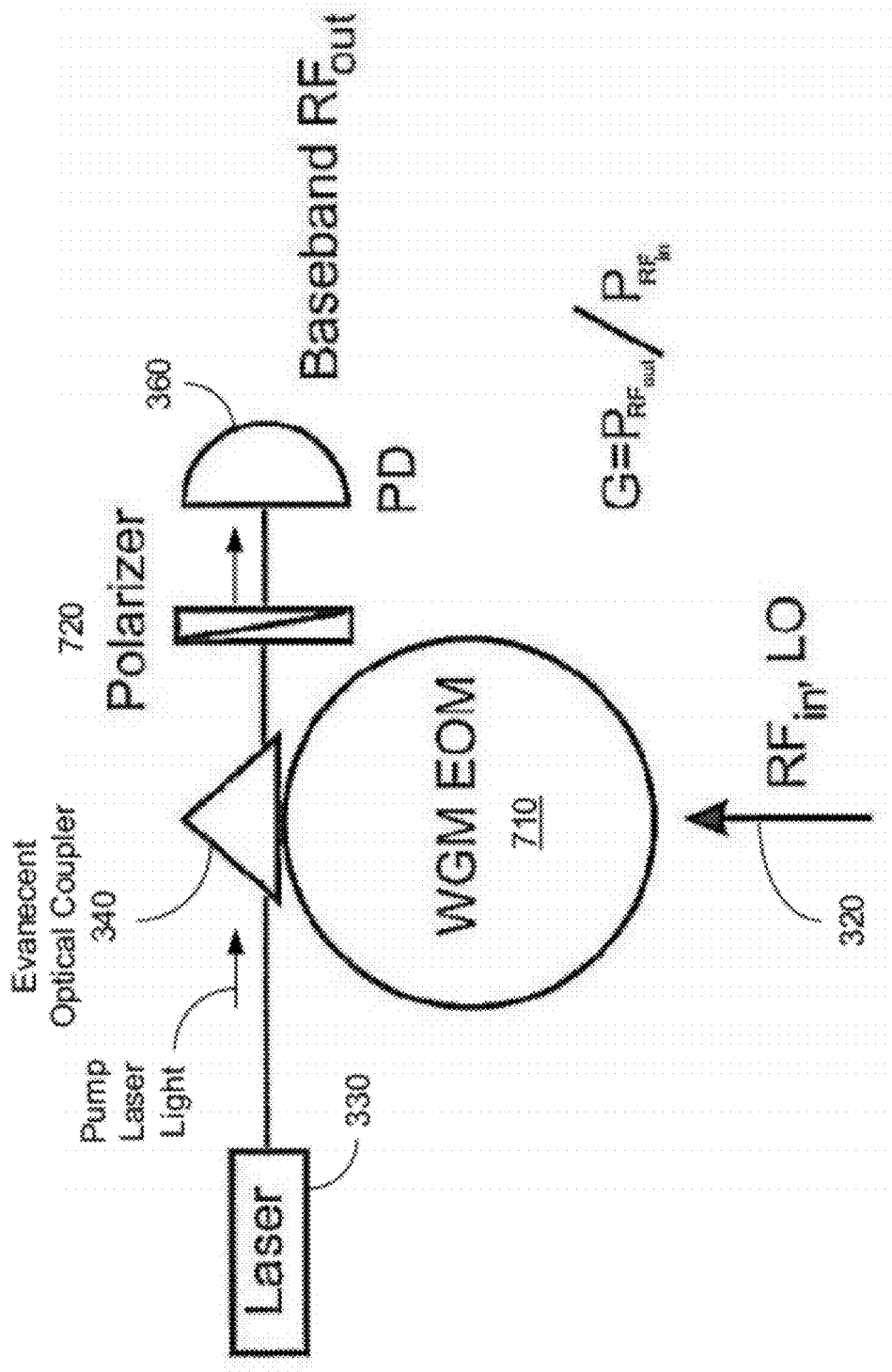
FIG. 7 illustrates a tunable photonic microwave/RF receiver based on the SSB modulator.

FIG. 7 illustrates a tunable photonic microwave/RF receiver based on the SSB modulator described above. The CW pump laser light coupled to the WGM EOM 710 based on an electro-optic material with off-diagonal electro-optic tensor elements is controlled to be at a desired input optical polarization. The output light coupled by the coupler 340 out of the WGM EOM 710 include light in both the input optical polarization and its orthogonal polarization. In order to allow only the light in the sideband to reach the detector, an optical polarizer 720 is inserted in front of the photodiode 360 to reject the light at the optical carrier frequency and to transmit light in the orthogonal polarization. The photodiode 360, like its counterpart in FIG. 3, is a baseband optical detector that detects the RF baseband signal carried by the sideband optical signal.

In the above photonic receiver FIG. 7, the RF field applied to the electrodes on the WGM resonator is controlled to have a radial component when the electro-optic material is a Z-cut lithium niobate crystal. The electric field polarization of the RF signal is in a plane of the circular optical loop of the WG modes of the WGM resonator. The interaction of the RF signal and the TE optical mode of the pump light generates photons in the TM optical mode. The interaction of the RF signal and the TM optical mode generates photons in the TE optical mode. The power of the photocurrent of the photodide 360 is $$P_s = \frac{P_{RF}/P_{RF0}}{(1+P_{RF}/2P_{RF0})^2 + [(\omega_{RF}-\omega_{FSR})/\gamma_s]^2} P_{optical\ in}$$

where PRF is the RF signal power of the RF signal 320, PRF0 represents the modulation efficiency and is proportional to the sturation power, γs is the HWHM of the optical sideband mode. The RF power generated by the sideband absorbed at the photodiode is proportional to the square of Ps and thus the square of PRF. Hence, this receiver is a quadratic receiver without having the optical carrier at the photodiode 360.

In FIG. 7, an RF or microwave local oscillator (LO) signal can be applied to the electrodes of the WGM resonator 710 along with the received input RF or microwave signal. In presence of the LO signal, the power of the photocurrent of the photodiode 360 becomes $$P_s = \frac{(P_{RF}+P_{LO}+2\sqrt{P_{LO}P_{RF}}\cos[\Delta\omega t+\varphi])/P_{RF0}}{(1+(P_{RF}+P_{LO}+2\sqrt{P_{LO}P_{RF}}\cos[\Delta\omega t+\varphi])/2P_{RF0})^2 + [(\omega_{RF}-\omega_{FSR})/\gamma_s]^2} P_{optical\ in}$$

where PLo is the power of the LO signal. The RF power generated by the sideband absorbed at the photodiode is proportional to the square of Ps and thus the square of PRF. Hence, this receiver remains as a quadratic receiver without having the optical carrier at the photodiode 360.

The above use of polarization-selective detection allows suppression of DC background noise caused by presence of the optical carrier for SSB modulation based photonic receivers. The SSB modulation based photonic receivers can be implemented in various configurations as illustrated in several examples described below.

Figure 8:
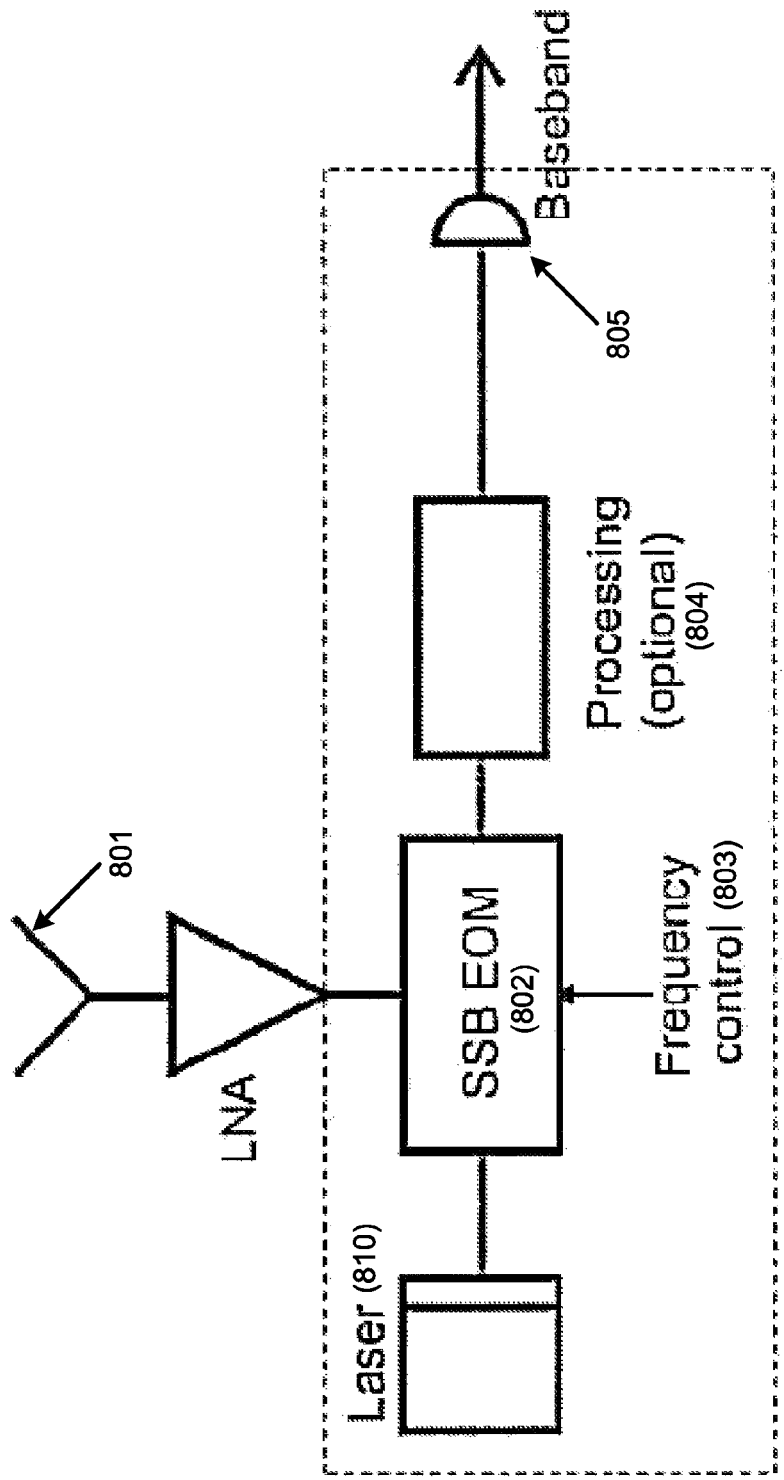
FIG. 8 shows a SSB modulation based photonic receiver without an RF LO signal.

FIG. 8 shows a SSB modulation based photonic receiver without an RF LO signal. An antenna is provided to receive an RF signal and directs the received RF signal to the electrodes of the electro-optic WGM resonator. A frequency control mechanism is provided for tuning the frequency of the generated single sideband. An optional optical processing unit is provided in the optical path between the output of the SSB modulator and the baseband photodetector. An example of this optical processing unit is a polarizer. Another example is an optical filter.

Figure 9:
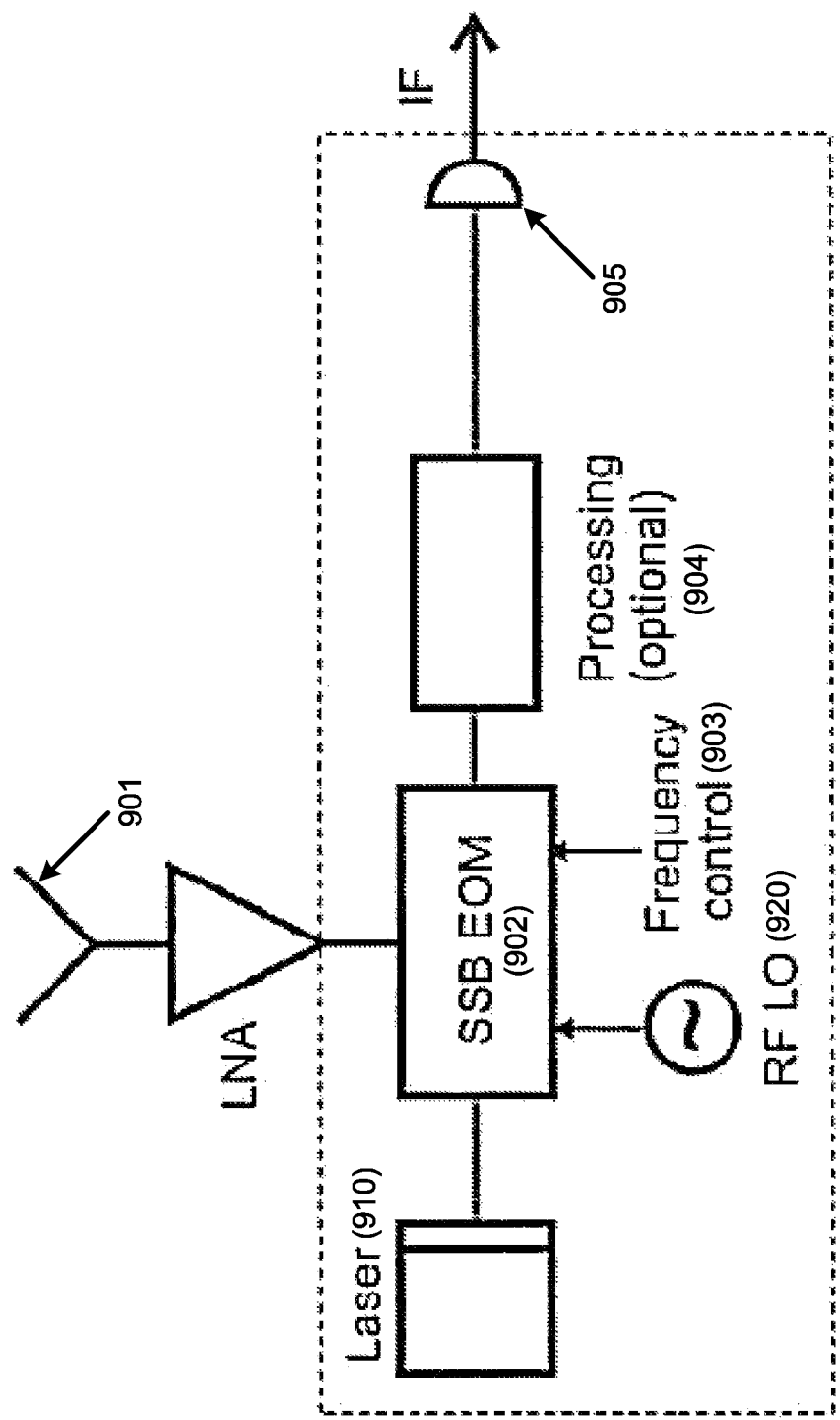
FIG. 9 shows a SSB modulation based photonic receiver that applies an RF LO signal to mix with the received input RF signal from the antenna.

FIG. 9 shows a SSB modulation based photonic receiver that applies an RF LO signal to mix with the received input RF signal from the antenna 901. A laser 910 is coupled to the electro-optic WGM resonator 902. A RF local oscillator 920 that applies the RF LO signal to mix with the received input RF signal is coupled to the electro-optic WGM resonator 902. A frequency control mechanism 903 is provided for tuning the frequency of the generated single sideband. Different from the direct baseband detection in FIG. 8, this device implements a coherent detection based on the mixing of the received RF signal and the RF LO signal. An optional optical processing unit 904 is provided in the optical path between the output of the SSB modulator and the photodetector 905. The photodetector 905 in FIG. 9 is no longer a baseband detector and is an IF detector that detects an RF signal carries the baseband signal.

In the above examples, a single baseband photodetector or IF photodetector is used. This single detector design limits the amount of power that can be received at the detector before saturating the detector. To further improve the receiver performance, two photodiodes can be configured in a balanced photodetector design to allow for detecting signals at higher powers while remaining below the saturation levels of the two photodiodes. In addition, the above designs apply the RF LO signal and the input RF signal to the SSB EOM. Due to the saturation of the electro-optic material, such designs can limit the total RF power that can be applied to the electro-optic material. SSB modulation based photonic receivers described below implement an optical LO or RF LO that is separate from the SSB EOM so that SSB EOM is exclusively used to receive the input RF signal to operate below its saturation level. Such designs allow for greater freedom in amplifying the received RF signal prior to applying the received RF signal to the electrodes of the SSB EOM.

Figure 10:
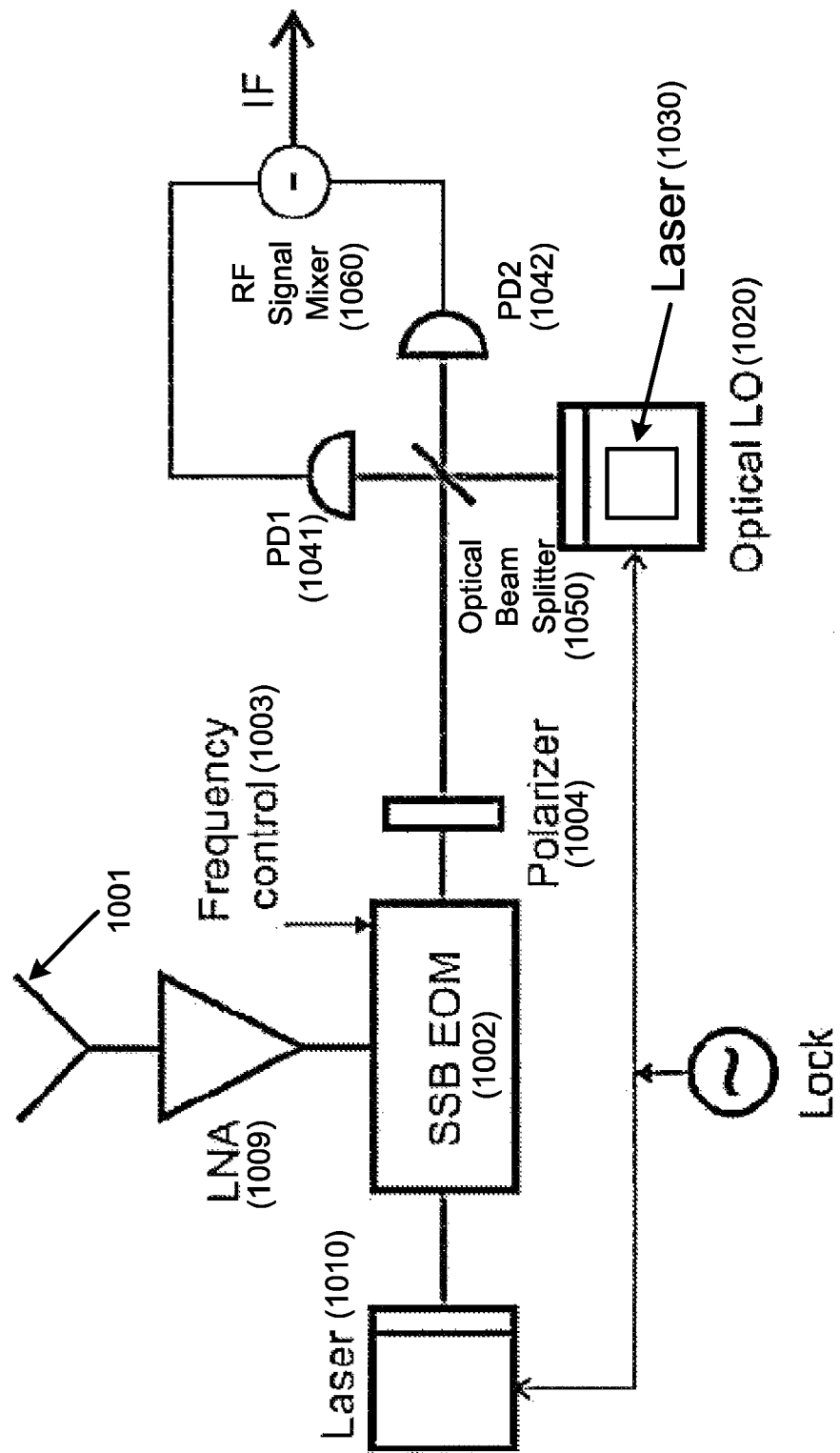
FIG. 10 shows a SSB modulation based photonic receiver that implements two photodiodes PD1 and PD2 configured in a balanced photodetector design and an optical LO signal.

FIG. 10 shows a SSB modulation based photonic receiver that implements two photodiodes PD1 1041 and PD2 1042 configured in a balanced photodetector design and an optical LO signal. An RF amplifier, e.g., a linear amplifier (LNA) 1009, is coupled between the antenna 1001 and the electrodes of the SSB EOM 1002 to amplify the received RF signal to a level below the RF saturation level of the SSB EOM. Two lasers are used where the first laser 1010 is used to produce CW laser pump light to pump the SSB EOM which produces output light containing the optical carrier and the single sideband. The second laser 1030 is part of the optical local oscillator (LO) 1020 and is phase locked to the first laser 1010. The second laser 1030 produces a CW light at an optical LO frequency.

In this design, an optical polarizer 1004 is used to eliminate the optical carrier frequency in the output of the SSB EOM and thus only light in the single sideband reaches the balanced photodetector. The optical LO has the same polarization of the polarization of the optical polarizer. An optical beam splitter 1050 is provided at an intersection of the optical paths of the optical output from the optical polarizer 1004 and the optical LO 1020. As such, one half of the total optical power of the optical output from the optical polarizer 1004 and the optical LO 1020 is directed to the PD1 1041 and the remaining half of the total optical power is directed to the PD2 1042. The detector outputs of the two detectors PD1 and PD2 are mixed at an RF signal mixer 1060 to produce an output RF signal which is an IF signal carrying the baseband signal originally in the received antenna signal. The difference of the optical frequency of the single sideband and the optical frequency of the optical LO signal is the IF frequency of the signal output by the RF signal mixer. In operation, the receiver in FIG. 10 is turned to the dark fringe that allows increasing the sensitivity of the reception.

Figure 11:
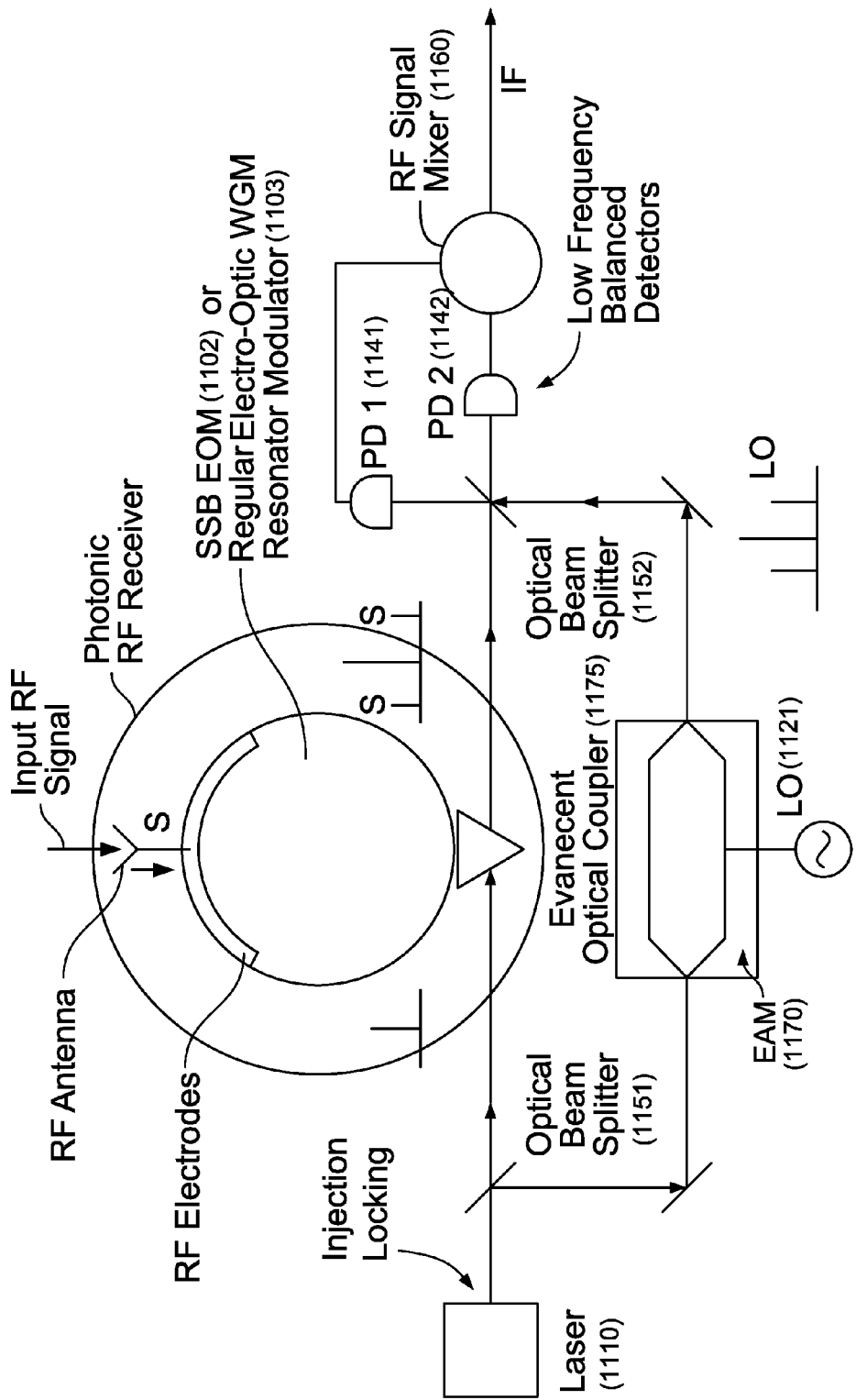
FIG. 11 shows another example of a SSB modulation based photonic receiver that implements two photodiodes configured in a balanced photodetector design and an RF LO via a second optical modulator to produce an optical LO from the same laser that pumps the SSB EOM.

FIG. 11 shows another example of a SSB modulation based photonic receiver that implements two photodiodes PD1 1141 and PD2 1142 configured in a balanced photodetector design and an RF LO via a second optical modulator to produce an optical LO from the same laser that pumps the SSB EOM. The CW laser light from the single laser 1110 is first split by a beam splitter 1151 into a CW pump beam for pumping the SSB EOM and a second CW laser beam along a different optical path. A second optical modulator, e.g., an electroabsorption modulator (EAM) 1170 or an electro-optic modulator, is placed in the optical path of the second laser beam to apply an RF LO signal from an RF LO source 1121 to modulate the second laser beam. This modulation produces a modulated optical beam that carries the RF LO signal and effectuates an optical LO signal. A second beam splitter 1152 is provided at an intersection of the optical paths of the optical output from the SSB EOM 1102 and the optical LO signal from the second optical modulator (in this example, EAM 1170). As such, similar to the detection in FIG. 10, one half of the total optical power of the optical output from the optical polarizer and the optical LO is directed to the PD1 1141 and the remaining half of the total optical power is directed to the PD2 1142. The detector outputs of the two detectors PD1 1141 and PD2 1142 are mixed at an RF signal mixer 1160.

The SSB EOM 1102 in FIG. 11 can be replaced by a regular electro-optic WGM resonator modulator 1103 operating under the scheme in FIG. 2. In both SSB EOM and the regular electro-optic WGM resonator modulator implementations described above and in other receiver examples in this document, the laser 1110 can be locked to the WGM resonator via injection locking where the evanescent optical coupler 1175 for coupling pump light into the WGM resonator couples a counter-propagating light in the WGM resonator back to the laser 1110 to cause the laser locking. Other laser locking techniques may also be used to lock the laser relative to the WGM resonator.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations and enhancements to the described implementations and other implementations can be made based on what is disclosed.

What is claimed is:

1. A whispering gallery mode resonator based device, comprising:
    an optical resonator made of an electro-optic material exhibiting an electro-optic effect and shaped to support one or more optical whispering gallery modes;
    electrodes formed on the optical resonator to receive an RF or microwave signal and to apply the received RF or microwave signal to the optical resonator;
    a laser that produces a continuous wave laser beam at an optical carrier frequency;
    an evanescent optical coupler located to couple the laser beam from the laser into the optical resonator and to couple light inside the optical resonator out to produce an output beam, where light inside the optical resonator is modulated via the electro-optic effect in response to the received RF or microwave signal to produce one or more modulation sidebands at frequencies different from the optical carrier frequency;
    a photodetector located to receive the output beam from the optical resonator to detect a baseband signal in the received RF or microwave signal; and
    an optical element located in an optical path between the evanescent optical coupler and the photodetector to transmit light to the photodetector while blocking light at the optical carrier frequency to prevent light at the optical carrier frequency from reaching the photodetector.

2. The device as in claim 1, wherein the optical element is an optical filter.

3. The device as in claim 2, wherein the optical filter is a Fabry-Perot etlon.

4. The device as in claim 1, wherein the optical element is an optical polarizer.

5. The device as in claim 4, wherein the electro-optic material exhibits an electro-optic property that, in response to the received RF or microwave signal, couples light between a first family of optical whispering gallery modes in a first optical polarization and a second family of optical whispering gallery modes in a second optical polarization that is orthogonal to the first optical polarization.

6. The device as in claim 5, wherein the electro-optic material is lithium niobate.

7. The device as in claim 5, wherein the electro-optic material is lithium tantalate.

8. The device as in claim 1, comprising a laser locking mechanism that locks the laser and the optical resonator in phase.

9. A whispering gallery mode resonator based device, comprising:
    an optical resonator made of an electro-optic crystal and structured to support optical whispering gallery modes in two orthogonally polarized transverse electric (TE) modes and transverse magnetic (TM) modes circulating along a circular optical loop near a rim of the optical resonator;
    a laser that produces a continuous wave laser beam at an optical carrier frequency;
    an evanescent optical coupler located to couple the laser beam from the laser into the optical resonator and to couple light inside the optical resonator out to produce an output beam;
    electrodes formed on the optical resonator to receive an RF or microwave signal and to apply it to the optical resonator in an electric field polarization oriented relative to a crystal axis of the electro-optic crystal to effectuate coupling between an optical whispering gallery mode in the TE mode and another optical whispering gallery mode in the TM mode to produce an optical single sideband on light in the optical resonator at a frequency different from the optical carrier frequency;
    an antenna that receives the RF or microwave signal from the air and is coupled to the electrodes to direct the received RF or microwave signal to the electrodes;
    a frequency control mechanism coupled to the optical resonator to tune a frequency spacing between the optical single sideband and the optical carrier frequency; and
    an optical detector unit that receives the output beam from the optical resonator.

10. The device as in claim 9, comprising a signal amplifier coupled between the antenna and the electrodes to amplify the received RF or microwave signal.

11. The device as in claim 9, wherein the electrodes formed on the optical resonator to apply the RF or microwave signal to the optical resonator in the electric field polarization that is in a plane of the circular optical loop.

12. The device as in claim 9, comprising:
a second laser that produces an optical local oscillator signal and is phase locked to the laser, and
a beam splitter that receives the optical local oscillator signal and the output beam from the optical resonator,
wherein the optical detector unit includes two photodiodes that respectively receive light from the beam splitter and a signal mixer that mixes outputs from the two photodiodes to produce an output.

13. The device as in claim 9, wherein the frequency control mechanism includes a voltage bias mechanism that applies and controls a DC voltage to the optical resonator to tune the frequency spacing.

14. The device as in claim 9, wherein the frequency control mechanism includes a temperature control mechanism that controls and tunes a temperature of the optical resonator to tune the frequency spacing.

15. The device as in claim 9, wherein the frequency control mechanism controls and tunes a compression applied to the optical resonator to tune the frequency spacing.

16. A whispering gallery mode resonator based device, comprising:
an optical resonator made of an electro-optic crystal and structured to support optical whispering gallery modes circulating along a circular optical loop near a rim of the optical resonator;
a laser that produces a continuous wave laser beam at an optical carrier frequency;
a first optical beam splitter to split the laser beam from the laser into a first laser beam and a second laser beam;
an evanescent optical coupler located to couple the first laser beam from the beam splitter into the optical resonator and to couple light inside the optical resonator out to produce an output beam;
electrodes formed on the optical resonator to receive an RF or microwave signal to the optical resonator;
an antenna that receives the RF or microwave signal from the air and is coupled to the electrodes to direct the received RF or microwave signal to the electrodes;
an optical modulator that receives the second laser beam and an RF local oscillator signal to modulate the second laser beam in response to the RF local oscillator to produce a modulated optical beam;
a second beam splitter that receives the modulated optical beam from the optical modulator and the output beam from the optical resonator to mix the modulated optical beam and the output beam to produce first and second output beams;
two photodiodes that respectively receive the first and second output beams from the beam splitter; and
a signal mixer that mixes outputs from the two photodiodes to produce an output.

17. The device as in claim 16, wherein the electro-optic material exhibits an electro-optic property that, in response to the received RF or microwave signal, couples light between a first family of optical whispering gallery modes in a first optical polarization and a second family of optical whispering gallery modes in a second optical polarization that is orthogonal to the first optical polarization.

18. The device as in claim 16, wherein the laser is phase locked to the optical resonator.

* * * * *